Patented Feb. 3, 1925.

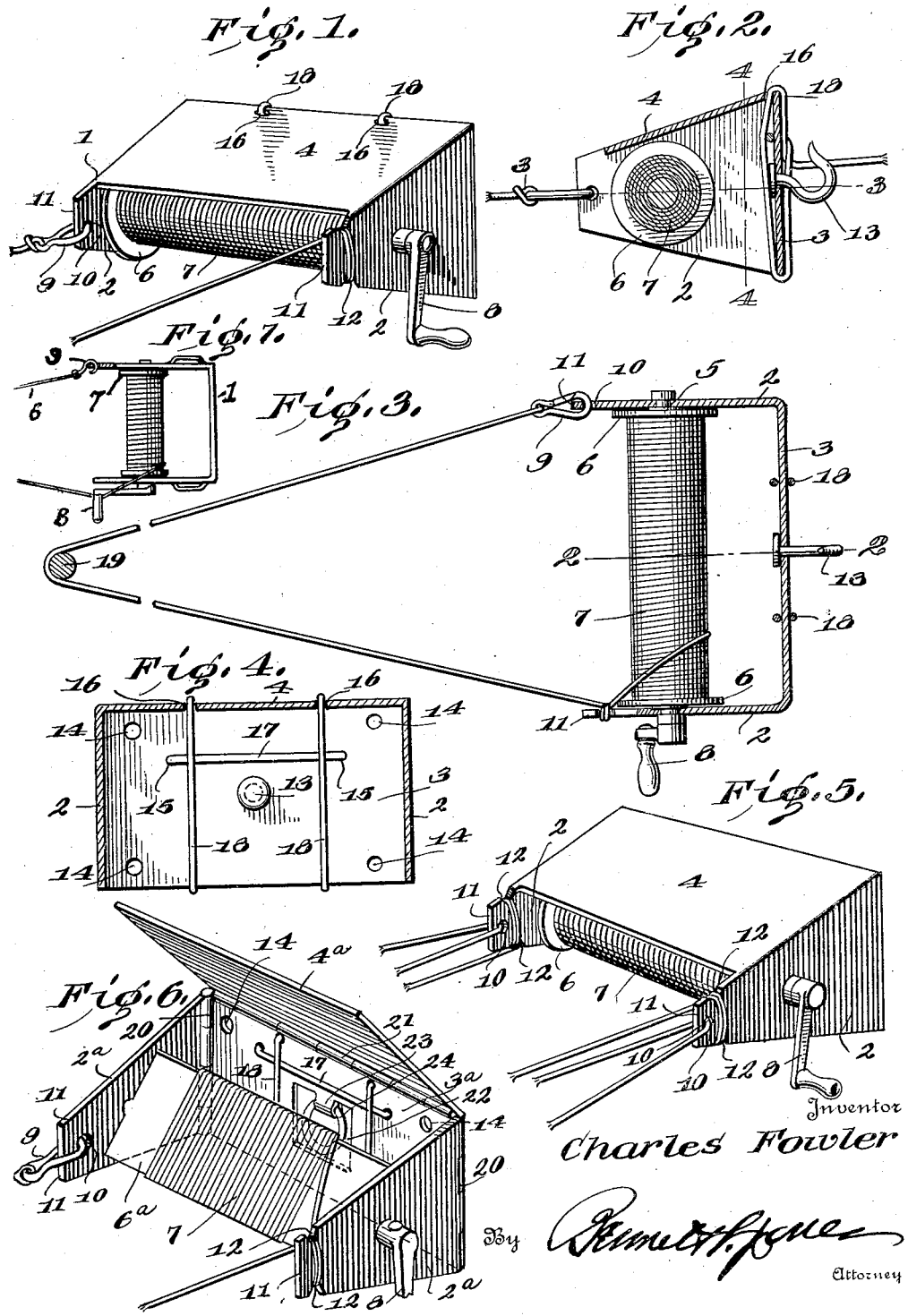

1,524,971

UNITED STATES PATENT OFFICE.

CHARLES FOWLER, OF TOMKINS COVE, NEW YORK.

CLOTHESLINE REEL.

Application filed July 14, 1923. Serial No. 651,560.

*To all whom it may concern:*

Be it known that I, CHARLES FOWLER, a citizen of the United States, residing at Tomkins Cove, in the county of Rockland and State of New York, have invented new and useful Improvements in Clothesline Reels, of which the following is a specification.

This invention relates to clothes line reels, the primary object of the invention being to provide a simple, inexpensive and efficient construction of reel which may be suspended from a fence post or other support indoors or outdoors and from which the clothes line may be extended in one or more line sections, as desired or required for use, and kept taut, and by means of which the line may at any time be wound up and packed away in close compass for storage or transportation or for carriage in a trunk, suit case or the like. A further object of the invention is to provide a reel supporting frame embodying means whereby the line may be secured and held taut without the necessity of using reel locking means.

A still further object of the invention is to provide a reel having a supporting frame provided with a cover section arranged to operate as a water shed, whereby the portion of the line wound upon the reel will be effectually protected from rain or snow and prevented from becoming clogged or soggy.

The invention consists of the features of construction, combination and arrangement of parts, hereinafter fully described and claimed, reference being had to the accompanying drawing, in which:—

Figure 1 is a perspective view of one form of clothes line reel constructed in accordance with my invention.

Figure 2 is a vertical section taken substantially on the line 2—2 of Figure 3.

Figure 3 is a horizontal section taken substantially on the line 3—3 of Figure 2.

Figure 4 is a vertical transverse section taken substantially on the line 4—4 of Figure 2.

Figure 5 is a view similar to Figure 1, showing another form of construction of reel frame.

Figure 6 is a view showing still another form of reel frame and reel.

Figure 7 is a detail view showing the use of the crank handle as a reel locking means.

Referring now more particularly to Figures 1 to 4, inclusive, of the drawing, 1 designates generally a reel supporting frame or casing, made of sheet metal or other suitable material, and comprising a pair of approximately triangular side walls 2 and a rear wall 3 connecting said side walls at their rear edges, which walls may be made of a single piece of material bent into the described shape. The frame or casing may also include a top or cover wall 4 which may be integral with the walls 2 and 3 or it may be primarily independent thereof and soldered or otherwise united thereto.

The walls 2 are provided with apertures 5 to receive the ends of the shaft of a reel 6, which may be in the form of a circular spool on which the line 7 is wound, one end of the line being fixed to the reel in any suitable manner. One end of the reel may be provided with an actuating crank handle or other device 8, by means of which the reel may be conveniently turned to wind up or pay out the line.

As stated, one end of the line is suitably fixed to the reel 6, while the opposite or free end thereof is provided with a snap hook or other suitable connecting member 9 which may be engaged with a receiving opening 10 provided in the forward reduced end 11 of one of the walls 2. The said forward ends 11 of the walls 2 project forwardly beyond the line of the front edge of the top wall or cover section 4, and the projecting portion 11 of the other wall 2 is formed in its top and bottom edges with line receiving grooves or notches 12.

Any suitable means may be provided for securing the reel to a fence, wall, fence post or other supporting post. As shown in the present instance, the rear wall 3 is provided with a hook 13 which may be engaged with an eye upon the surface to which the reel is to be attached, and the wall 3 may be provided with openings 14 for the passage of nails, screws or other fastenings for securing the reel to a fence or other surface when it is desired to employ a fixed instead of a detachable connection. The wall 3 may also be provided with openings 15 and the wall 4 with openings 16 for the passage, respectively, of horizontally and vertically disposed attaching cords, straps, or the like 17 and 18, whereby the reel frame may be tied or bound to a post or other support when desired or when fastenings of the type previously referred to can not be well or purposely used.

In the use of the reel, constructed as above described, it will be understood that the reel may be secured to a fence or other support at one side of a yard or drying space or in the room of a house, etc., and the hook 9 detached from the opening 10 and the line extended back and forth one or more times around posts 19 or through screw hooks or eyes or other guides on similar supports 19 at the other side of the yard, room or drying space, so that the line may be extended back and forth in any desired number of line sections and then made fast to the reel frame to maintain it in taut condition. For this purpose a portion of the line adjacent to the point at which it unwinds from the reel, may be looped one or more times around the projection 11 within the notches 12, whereby a convenient means for fastening the line in extended and taut condition is provided without the necessity of employing means for locking the reel itself against rotation. Instead of extending the line one or more times back and forth in the manner described, the hook 9 may be left fixed in the opening 10 and the line in looped form drawn off from the reel by an unwinding action, extended back and forth between the reel and any number of the opposite supporting posts 19, and then connected with the notched projection 11 in the manner described to hold the line fixed after it has been stretched to the desired degree of tautness. Whenever it is desired to wind up the reel, this may be effected by simply disengaging the line from the notched projection 11 and winding up the line on the reel by actuation of the crank handle 8. When the line is thus wound up, the fastening 9 will connect the free end of the line with the reel frame and, if desired, a portion of the line may be engaged with the notched projection 11, by means of which the free end of the line will be prevented from unwinding or the line from loosening on the reel, enabling the parts to be kept in compact order and stored or shipped in such condition. As shown in Figure 7, the crank handle 8 itself may be engaged by the line to hold the line taut, the crank handle thus acting as a simple and effective reel locking means.

By the construction of the approximately triangular side walls 2, it will be observed that the top wall 4 slopes in a downward and forward direction and overhangs the reel 6 and the body of the line 7 wound thereon. By this means the reel and wound portion of the line will be protected from possible damage or injury and at the same time the wall 4 will serve to shed all rain water or snow and will prevent the same from coming in contact with the wound portion of the line and causing the same to become soggy or damp. The line will thus always be in condition to easily wind and unwind and will be protected against mildewing or rotting, whereby its life period will be materially prolonged.

In the form of my invention shown in Figure 5, substantially the same structure as that illustrated in Figures 1 to 4, inclusive, is employed, except that the hook 9 is dispensed with and both end projections 11 of the side walls 2 are provided with openings 10 and notches 12. With this construction the free end of the line may be wound about the notched projection 11 of one wall 2, the line extended back and forth through the openings 10 in one or more looped stretches or strands and a portion of the line wound about the notched projection 11 of the other wall 2 to fasten the line against movement and hold it in taut condition, this construction providing a simple, reliable and efficient means whereby the line may be extended in any desired number of supporting strands and secured to the frame or casing of the reel without the use of any fastening connections whatever.

In the form of my invention shown in Figure 6, the body construction of the frame or casing may be the same as that previously described, but a collapsible type of structure is here provided. As shown this frame or casing comprises side walls $2^a$, a rear wall $3^a$ and a top wall or cover section $4^a$. The side walls $2^a$ and rear wall $3^a$ are provided with knuckles at their meeting edges for the passage of connecting pins, providing hinge-joints 20, adapting the walls $2^a$ to fold inwardly over upon the wall $3^a$ in collapsing the frame or casing. Similarly the meeting edges of the walls $3^a$ and $4^a$ are formed with knuckles connected by a pin providing a hinge-joint connection 21 between said walls, adapting the wall $4^a$ to fold downwardly upon the folded walls $2^a$, so that the frame or casing may be collapsed in a substantially flat condition for convenient package in a container for ease of transportation or storage or to enable a complete reel to be conveniently packed in a box for sale or other purposes. The construction of the side walls $2^a$ in this case may be similar to that shown in Figures 1 to 4, inclusive, or similar to that shown in Figure 5, that is to say, with this folding type of frame or casing the hook 9 may be provided for use with an opening 10 in one side wall projection 11, and the projection 11 of the other end wall 2 notched, or both wall projections 11 may be provided with openings 10 and notches 12, as shown in the structure disclosed in Figure 5. With this construction also I may use a flat reel $6^a$, instead of the round or spool-shaped reel 6, the journals or shaft ends of which reel 6ᵃ detachably fit within the openings 5 and may be secured against displacement by the crank handle 8 applied to one journal and a cotter pin or the like applied to the other journal. In the construction shown in Figure 6, I have also shown the rear wall 3ᵃ provided with a cut-away portion or opening 22, one wall of which has an extension bent to provide a loop 23 pivotally receiving a supporting ring 24 which may be employed in lieu of the hook 13. The construction shown in Figure 6 provides a folding or take-down type of structure which may be easily and conveniently set up for use and as readily and conveniently collapsed and packed in close compass for storage or transportation, as will be readily understood.

From the foregoing description, taken in connection with the drawing, the construction and mode of use of my improved clothes line reel will be readily understood and it will be seen that the invention provides a device of this character which is simple of construction, capable of being manufactured and sold at a comparatively low cost, and which effectually protects the reel from damage or the action of the elements and adapts the line to be extended as desired for use and secured firmly in taut condition without the necessity of employing complex fastenings, the convenience of which will be apparent. Also it will be seen that my invention provides a clothes line reel which may be conveniently used in a room of a residence or apartment, or in the cellar or other enclosed space, and that the device may be made in such small size, as to be conveniently carried in a trunk, suit case or like article by travelers who may desire its occasional use, the construction shown in Figure 6 being especially adapted for this purpose in providing a folding type of article which may be packed in a very small amount of space.

Having thus fully described my invention, I claim:

1. A clothes line reel comprising a casing including side walls, a reel journaled in said side walls, a line attached to the reel, and a fastening device connected with the free end of the line, the forward end of one of the side walls being provided with an opening to receive said fastening device and the forward end of the other side walls having notched portions to receive a portion of the line.

2. A clothes line reel comprising a casing including a rear wall and approximately triangular side walls, a sloping cover, a reel journaled in the side walls beneath the sloping cover, and a line attached to the reel, said side walls having their end portions projecting beyond the cover, one of said end portions being notched to receive a portion of the line.

3. A clothes line reel including a casing comprising a rear wall, side walls hinged to the rear wall, a sloping top wall hinged to the rear wall, a reel journaled in the side walls, and means forming part of the front ends of the side walls for engagement of portions of the line therewith.

4. A clothes line reel including a casing, a reel journaled therein, a line secured at one end to the reel and adapted to be wound thereon and unwound therefrom, means for attaching the casing to a support, a fastening member for connecting the free end of the line to a part of the casing, and means for engaging a paid out portion of the line with a part of the device for holding such portion of the line taut.

In testimony whereof I affix my signature.

CHARLES FOWLER.